A. P. BRUSH.
STEERING AXLE FOR AUTOMOBILES.
APPLICATION FILED APR. 5, 1915.
1,184,416.
Patented May 23, 1916.
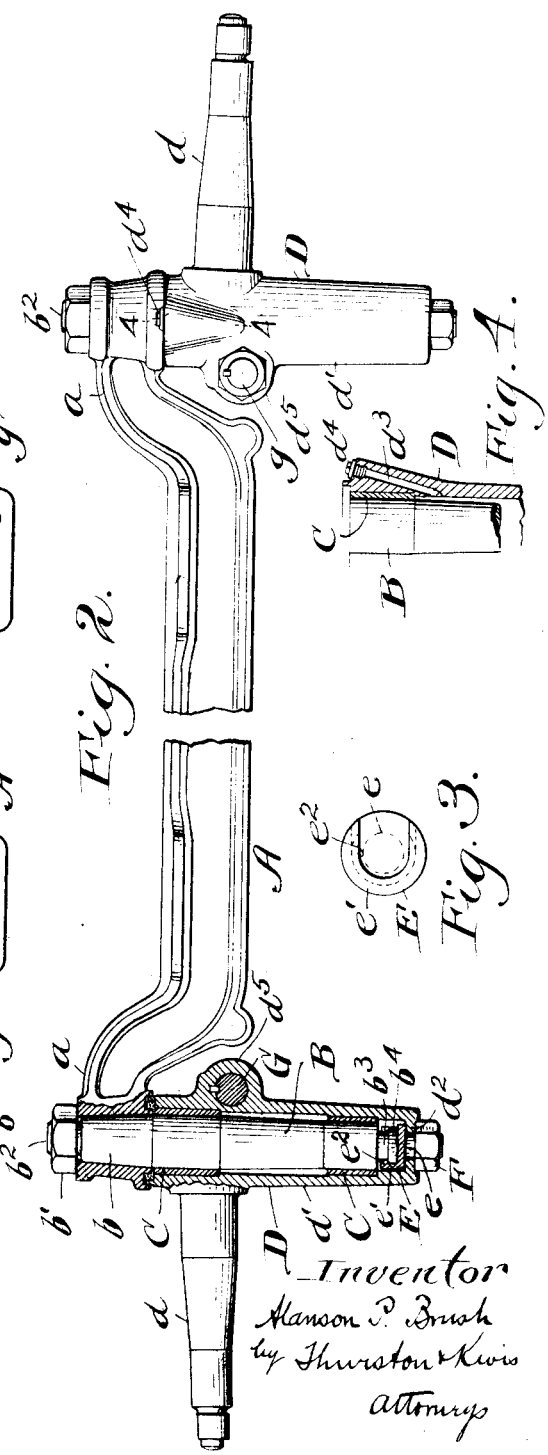

UNITED STATES PATENT OFFICE.

ALANSON P. BRUSH, OF DETROIT, MICHIGAN.

STEERING-AXLE FOR AUTOMOBILES.

1,184,416.  Specification of Letters Patent.  Patented May 23, 1916.

Application filed April 5, 1915. Serial No. 18,123.

*To all whom it may concern:*

Be it known that I, ALANSON P. BRUSH, a citizen of the United States, residing at Detroit, in the county of Wayne and State of Michigan, have invented a certain new and useful Improvement in Steering-Axles for Automobiles, of which the following is a full, clear, and exact description.

The present invention relates to means for mounting the steering knuckles on the ends of the front axle of a motor car.

The object of the invention is to provide a construction which will be strong, and which may be kept thoroughly lubricated, so that the steering wheels may be easily turned.

The invention consists in the construction and combination of parts hereinafter described and pointed out definitely in the appended claims.

In the drawings, Figure 1 is a plan view of an axle embodying the invention; Fig. 2 is a front elevation thereof with one of the connectors between the axle and steering knuckle shown in vertical section; Fig. 3 is a plan view of the end thrust member E, and Fig. 4 is a sectional side view of the upper part of one of the sleeves D, this section being on the plane of line 4—4 on Fig. 2.

Referring to the parts by letters, A represents the front axle which, except for the peculiarities of construction hereinafter particularly pointed out, may be of any suitable or conventional form. The ends $a$ of this axle are bent so as to lie in a higher plane than the body of the axle. This is so that when the parts are assembled wheel spindles $d$ will be approximately in the same horizontal plane as the main body of the axle.

A substantially vertical knuckle spindle B is fixed to each of these axle ends $a$ and extends downward therefrom. In the specific construction shown, the upper end of each knuckle spindle is tapered, as at $b$, and fits a correspondingly tapered hole in the axle end; and it is held therein by a nut $b'$ which screws onto the threaded upward extension $b^2$ thereof. Each knuckle D is formed with the usual wheel spindle $d$. It is likewise formed with a downwardly extended sleeve $d'$ which is formed integral with said wheel spindle. This sleeve is open at its upper end in order that the knuckle spindle B may be passed down into it, and is substantially closed at its lower end. Within the sleeve $d'$ may be two bushings C C, within which cylindrical parts of the knuckle spindle B may be rotatably mounted.

E represents a thrust member. This as shown is formed independently of the sleeve, but it rests upon the bottom $d^2$ of the sleeve $d'$; and it has a threaded stem $e$ which projects through a hole in the bottom of said sleeve. A nut F which screws onto the projecting lower end of this threaded stud fastens this thrust member down on the bottom of the sleeve, and thereby, among other things closes the hole in the bottom of the sleeve so that oil may not run out. This thrust member is formed with an annular upwardly extended flange $e'$, which has, along its upper edge, an inwardly projecting flange $e^2$. At one side of this thrust member E the flanges $e'$ and $e^2$ are cut away, so as to permit the head $b^4$, on the lower end of the spindle B, to pass into it, and to allow the flange $e^2$ to pass into an annular groove $b^3$ near the lower end of said spindle and just above said head. The bottom of the spindle rests upon the thrust member E which serves as a step bearing therefor. The flange $e^2$, by projecting into the groove $b^3$, extends over and engages the upper surface of the head $b^4$ which is formed on the lower end of the spindle B by the said groove $b^3$.

The sleeve $d'$ may be kept filled with oil which may be introduced through an oil duct $d^3$ which is normally closed by the screw cap $d^4$. The usual steering arms G may be connected with the knuckles in any suitable way. As shown, a boss $d^5$ is formed on each sleeve $d'$ and the shank of a steering arm may be fitted into a hole in this boss and there secured by a nut $g$. And the two arms G may be connected by the rod H.

Having described my invention, I claim:

1. The combination of a steering wheel knuckle formed with a vertical sleeve having an open upper end, an axle, a spindle which is rigidly fixed at its upper end to said axle and extends vertically downward therefrom into said sleeve and is rotatably mounted therein, and means preventing the longitudinal movement of said spindle in said sleeve.

2. The combination of a steering wheel knuckle formed with a vertical sleeve having an open upper end, means closing the lower end of said sleeve and thereby adapting it to retain oil, an axle, a spindle which is rigidly fixed at its upper end to said axle and extends vertically downward therefrom into said sleeve and is rotatably mounted therein, a thrust bearing in said sleeve taking the down thrust of said spindle, and means preventing the upward movement of the spindle in said sleeve.

3. The combination of an axle having at each end a downwardly extended knuckle spindle, and, associated with each of the said spindles, a steering knuckle having a downwardly extended sleeve which is open at its upper end and closed at its lower end,—said knuckle spindle being projected down into said sleeve and being rotatably fitted therein, and said spindle having adjacent to its lower end an annular groove, a thrust member E removably secured in said sleeve at the bottom thereof and having a multilated annular upstanding flange, and at the upper end of said flange an inwardly turned flange which projects into said annular groove in the spindle.

4. The combination of an axle having at each end a downwardly extended knuckle spindle, and, associated with each of the said spindles, a steering knuckle having a downwardly extended sleeve which is open at its upper end and closed at its lower end,—said knuckle spindle being projected down into said sleeve and being rotatably fitted therein, and said spindle having adjacent to its lower end an annular groove, a thrust member E removably secured in said sleeve at the bottom thereof and having a mutilated annular upstanding flange, and, at the upper end of said flange, an inwardly turned flange which projects into said annular groove in the spindle, said thrust member having a downwardly projected threaded stud which passes through a hole in the bottom of the sleeve, and a nut holding said thrust member down against the bottom of said sleeve.

5. The combination of a steering knuckle formed with a vertical sleeve having an inturned flange at its lower end, an axle, a spindle which at its upper end is rigidly fixed to said axle and extends vertically downward therefrom into said sleeve and is rotatably mounted therein, a step bearing in the lower end of the said sleeve supported by said inturned flange against which the lower end of said spindle engages, which step bearing is provided with a stem which passes out of the lower end of the sleeve, and a nut which screws onto the projecting end of said stem.

In testimony whereof, I hereunto affix my signature in the presence of two witnesses.

ALANSON P. BRUSH.

Witnesses:
A. J. HUDSON,
C. V. SCHURGER.